Patented Jan. 16, 1934

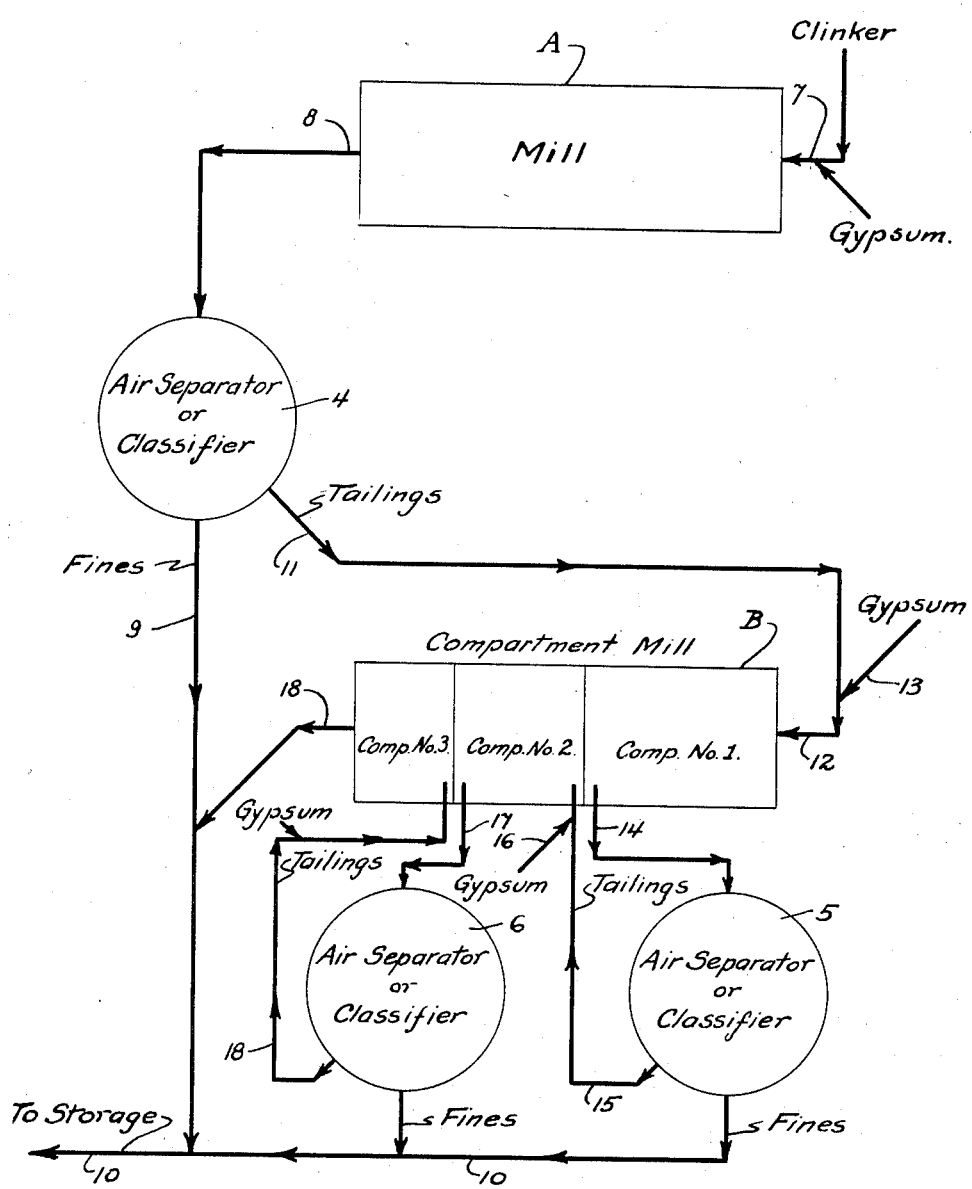

1,943,817

UNITED STATES PATENT OFFICE

1,943,817

METHOD OF GRINDING PORTLAND CEMENT

Harold J. Dunton, San Andreas, Calif., assignor to Calaveras Cement Co., San Francisco, Calif., a corporation of California Application June 9, 1931. Serial No. 543,149

4 Claims. (Cl. 106—25)

This method relates to a method of grinding so-called special Portland cement, first to increase the percentage of superfine material contained; secondly, to insure a uniform and intimate mixture of cement and raw gypsum; and third, to produce a special Portland cement of uniform quality, that is, of uniform strength and setting time by preventing total conversion of raw gypsum into plaster of Paris and dead burned gypsum.

In the manufacture of standard Portland cement, cement clinker with the addition of the proper percentage of raw gypsum is reduced by grinding to such a degree of fineness that approximately 80% will pass a 200 mesh sieve. Special Portland cement is produced in the same manner but it is subjected to more grinding in fact the grinding is carried on until approximately 98% of the cement will pass a 200 mesh sieve.

In the manufacture of special Portland cement it has been found that a cement of uniform quality is difficult to obtain. In order that this may be fully understood it may be stated that in the manufacture of either standard or special Portland cement, the cement clinker is ordinarily delivered to the grinding mill at a temperature of between 125° F. and 150° F. During the grinding operation part of the power or energy exerted is converted into heat. In the manufacture of standard Portland cement the increase in temperature of the material due to the added heat is not sufficient to raise the temperature of the material to such a degree that too high a percentage of gypsum is converted to plaster of Paris and dead burned gypsum, hence the standard Portland cement produced is of uniform quality.

Where special Portland cement is the desired product, the grinding operation is extended. The energy converted into heat is accordingly increased and the material subjected to grinding will under such conditions often reach the critical temperature with the conversion of too high a percentage of the raw gypsum into plaster of Paris, hence producing a cement with corresponding variations in uniformity, that is, as to strength and time of setting. The lack of uniformity in the quality of cement manifests itself in the behavior of the finished material, particularly in regard to the time of setting. This may change considerable with the varying conversion of raw gypsum into plaster of Paris and dead burned gypsum. The conversion of gypsum into plaster of Paris is entirely due to the raising of the temperature of the material during the process of grinding. When this temperature is reached some of the water of crystallization is lost and a whole or partial conversion from raw gypsum to plaster of Paris and dead burned gypsum takes place. It has also been found that the quality and uniformity of the finished product can be further improved if an intimate mixture of the raw gypsum and cement is insured.

Experimentation has shown that it is the superfine or impalpable material in Portland cement which produces great strength at early periods, that is, three days or less. Experimentation has shown that by grinding cement clinker so that all of the particles are finer than 400 mesh the cement so ground is more active not only in the early periods but in the later periods as well. It has further been found that material retained on a 400 mesh sieve has very little value in producing strength in cement especially in the first three days and it has further been found that gypsum must be uniformly distributed in special Portland cement, that is, in an exceedingly finely ground cement, and that the temperature during grinding must be carefully controlled in order that a uniform quality can be insured.

It should be understood that impalpable or superfine material are particles smaller than 30 microns (600 mesh approximately) but more particularly particles smaller than 10 microns (1200 mesh and finer).

The object of the present invention is to generally improve and simplify methods of grinding special Portland cement to improve the product obtained; to provide a method of grinding whereby the quantity or percentage of superfine impalpable material may be increased; amounting to 98% passing a 400 mesh sieve, the product being also higher in the finer fractions unmeasurable by existing sieves, that is, 30 microns and smaller; to provide a method of grinding whereby a sufficiently low temperature may be maintained to prevent total conversion of gypsum into plaster of Paris and dead burned gypsum; to provide a method of grinding embodying grinding of the material in successive stages; to provide a method of grinding which insures better classification of the feed making possible more efficient work by the grinding media by preventing an excess of either fine or coarse materials; to provide a method of grinding whereby accumulation of fines to such an extent as to produce a cushioning effect is prevented; to provide a method of grinding whereby the gypsum is added to each stage of grinding thereby insuring a more uniform distribution of the gypsum throughout the product; and, further, to provide a method of separation or classification in which separators are interposed between each stage of grinding so that the material discharged from one mill is passed through a separator, the tailings removed by the separator are passed on to a second mill and so on, while the fines passing through the separator are conveyed directly to the material bins, hence providing a method of separation whereby no material is ever passed through the same mill nor through the same separator with the result that the separators can be adjusted to operate at greater efficiency and the tailings from each succeeding classifier will be finer and finer and require less work to reduce them to the desired degree of fineness.

The method of grinding employed is shown by way of illustration in the accompanying drawing, which is a diagrammatic view of one form of apparatus which may be employed.

Referring to the drawing in detail, A indicates a single compartment mill and B a plurality compartment mill which is divided into the compartments marked No. 1, 2 and 3; tube mills or any other suitable type of mill being employed.

The material to be ground, to-wit, cement clinker and gypsum is delivered to each mill or compartment by rotary table feeders or the like, these feeders being adjustable so that predetermined proportions of clinker and gypsum may be maintained. Air separators or classifiers are interposed between the several mills or compartments as indicated at 4, 5 and 6 and conveyors conduct the material from the mills to the separators and from the separators to the succeeding mill so that the material may be automatically advanced from mill to separator and from separator to the succeeding mill or compartment as will be later described.

In actual operation cement clinker and gypsum is delivered as at 7 to the feed end of the mill indicated at A and it is here ground to such an extent that from 50% to 70% of the product will pass a 400 mesh sieve. The product of the mill discharges at the point 8 and is conveyed by a suitable conveyor in the direction of the arrows to the air separator or classifier indicated at 4 which removes most of the above fine fractions. The fines separated by the separator discharge into a conveyor diagrammatically indicated at 9 and this conveyor in turn discharges to a final conveyor diagrammatically indicated at 10 which carries the material to storage. The coarse materials or tails separated by the separator indicated at 4 discharge into a conveyor diagrammatically indicated at 11 and this delivers the material to the feed end 12 of compartment number 1 of the multiple compartment mill B. Gypsum is added at the point as indicated at 13. The gypsum and clinker is thus subjected to a grinding action in compartment 1 of the mill and the material discharges at the opposite end in the direction of the indicating arrow 14, where a conveyor carries the product to the separator indicated at 5. The fines from this separator are delivered to the conveyor 10 while the tailings discharge in the direction of arrow 15 to a conveyor which delivers the material to compartment number 2, additional gypsum being added at the point 16, the material being discharged from compartment number 2 is conveyed as indicated by arrow 17 to the separator 6. The fines are discharged to the conveyor 10 while the tailings are discharged as at 18 and delivered to the feed end of compartment 3, the discharge from this compartment being the final and being carried to the conveyor 9 as indicated by arrows 19.

An essential feature of this method of grinding is the addition of gypsum. In the first mill indicated at A only enough gypsum is added so that the superfine product of the air separator 4 discharging on the conveyor 9 will not contain an excess of 2.5% of sulphur trioxide. Sufficient gypsum is added to the second mill as at 13 so that the product of this mill will not contain an excess of 2.5% of sulphur trioxide. If the second mill indicated at B is divided into two or more compartments then only sufficient gypsum is added with the tails to each succeeding division so that the superfine product of each air separator 5 and 6 and the product of the final division of the mill, which does not pass through a classifier, shall not contain an excess of 2.5% of sulphur trioxide. This method of adding gypsum insures a uniform proportion of cement clinker and gypsum and it furthermore insures an intimate mixture of the same.

The present process furnishes each succeeding stage of grinding with a better classified feed and as such makes possible more efficient work by the grinding media which is not hindered by an excess of either fine or coarser material. The mixture of cement clinker and gypsum enters each mill and compartment at one end and discharges at the other, hence preventing the accumulation of sufficient fines to prevent efficient grinding in any of the stages. The fines are removed by the classifiers and the tails from each succeeding classifier being finer require less and less work to reduce them to the desired fineness. The method increases not only the percentage of material finer than 400 mesh but also the still finer fractions, not at present measurable by any existing sieve. This is due to the increased efficiency secured by more uniform sized feed to each succeeding grinding department or mill and to the fact that the material in any stage of grinding is not left sufficiently long to permit over accumulation of the fine fractions.

Due to the multi stage grinding of the cement clinker and the gypsum, overheating is prevented, hence preventing conversion of gypsum to plaster of Paris. None of the efficiency of the gypsum is for this reason impaired as a retarder because of the small amount of work and correspondingly low temperature maintained in each stage of grinding. The material discharging from each mill passes through individual separators which remove fines, 98% of which will pass a 400 mesh sieve. These classifiers can be worked to utmost efficiency because the material makes only one passage through the same hence the classifiers adjustments can be more carefully set for the smaller loads. No material is ever returned through the same classifier nor are the tails from any classifier passed through the same classifier as they are delivered to the succeeding mill and then to another classifier.

By this process:

1. A product containing greater quantities or percentage of superfine impalpable material is made possible amounting to substantially 98% passing a 400 mesh sieve, said material being also higher in the finer fraction not measurable by existing sieves, to-wit, 30 microns and smaller.

2. Uniform distribution of gypsum through the product is insured, insuring a product more uniform as to strength and time of setting.

3. Sufficiently low temperatures are maintained throughout the several stages of grinding to prevent total conversion of gypsum to plaster of Paris.

4. The method produces a high quality cement due to small particle size, and uniform distribution of gypsum without conversion of the same.

5. The method insures high efficiency in the production of small size particles due to the careful classification of the feed entering each mill and due to the continuous removal of the superfines which would otherwise produce a cushioning effect.

6. Better separation and greater efficiency is maintained due to only one passage of material through each classifier.

7. The product of this process may be mixed with ordinary Portland cement in any proportion whatsoever. The product increases the early strength of cement both tensile and compressible. It increases its workability, the water-proofness of the same and furthermore increases the covering power due to the greater surface area of particles.

Having thus described my invention, what I claim and desire to secure by Letters Patent is—

1. A method of grinding Portland cement material to special fineness which consists in passing cement clinker through a grinding mill, subjecting the material after grinding to a separating action to remove substantially all material which will pass a 400 mesh sieve, passing the tailings caught by the sieve through a second grinding mill, subjecting said tailings after passage through the mill to a second separating action to remove substantially all material which will pass a 400 mesh sieve and continuing the operation of grinding and separating until substantially all material has been ground to pass a 400 mesh sieve.

2. A method of grinding cement clinker and gypsum to special fineness and to insure a uniform and intimate mixture of cement and gypsum which consists in passing predetermined proportions of cement clinker and gypsum through a grinding mill, subjecting said material after grinding to a separating action to remove substantially all material which has been ground to a predetermined degree of fineness, passing the tailings from the separating action, together with a predetermined additional quantity of gypsum, through a second grinding mill, subjecting said material after passage through the mill to a second separating action to remove substantially all material ground to a predetermined degree of fineness and continuing the operation of adding predetermined quantities of gypsum and grinding and separating until substantially all material has been ground to a predetermined degree of fineness.

3. A method of grinding cement clinker and gypsum to special fineness and to insure a uniform and intimate mixture of cement and gypsum which consists in passing cement clinker through a grinding mill, passing material after grinding through a separator to remove substantially all material which has been ground to a predetermined fineness, adding to the clinker sufficient gypsum so that the fine product separated from the ground material will not contain an excess of 2.5% of sulphur trioxide, passing the tailings from the separating action through a second mill, subjecting the material after passage through the mill to a separating action to remove substantially all material ground to a predetermined fineness, adding sufficient gypsum to the tailings entering the second mill so that the fine product removed by the separator will not contain an excess of 2.5% of sulphur trioxide, and continuing the operation of adding gypsum, grinding and separating until substantially all material has been ground to a predetermined degree of fineness.

4. A method of grinding Portland cement material to special fineness which consists in subjecting cement clinker and a predetermined portion of gypsum to a grinding operation in which a portion of the cement clinker and most of the gypsum is ground to a fineness required in the finished product, subjecting the material to a separating action to remove the finished product from the coarse material, again adding a predetermined proportion of gypsum to the coarse material and subjecting the material to a second grinding operation where a certain proportion of the coarse material and most of the gypsum is ground to the degree of fineness required in the finished product, again subjecting the material to a separating action to remove the finished product, and continuing the operation of adding predetermined proportions of gypsum and grinding and separation until substantially all material has been reduced to a finished product.

HAROLD J. DUNTON.